United States Patent [19]

Yamasaki

[11] 4,367,022

[45] Jan. 4, 1983

[54] EXPOSURE CONTROL CIRCUIT FOR CAMERA OF TTL REFLECTIVE PHOTOMETRY TYPE

[75] Inventor: Masafumi Yamasaki, Hachioji, Japan

[73] Assignee: Olympus Optical Company Ltd., Tokyo, Japan

[21] Appl. No.: 342,512

[22] Filed: Jan. 25, 1982

[30] Foreign Application Priority Data

Mar. 24, 1981 [JP] Japan .................................. 56-43052

[51] Int. Cl.³ ............................................. G03B 7/083
[52] U.S. Cl. ....................................... 354/24; 354/31; 354/51
[58] Field of Search ...................... 354/24, 31, 51, 50; 250/214 P

[56] References Cited

U.S. PATENT DOCUMENTS 4,064,517 12/1977 Maitani et al. ......................... 354/51
4,072,961 2/1978 Yamada ................................. 354/24
4,295,720 10/1981 Mizokami et al. ..................... 354/51

FOREIGN PATENT DOCUMENTS 54-151029 11/1979 Japan ..................................... 354/31
55-157728 12/1980 Japan ..................................... 354/24
2016718 9/1979 United Kingdom ................. 354/24

Primary Examiner—William B. Perkey
Attorney, Agent, or Firm—Weinstein & Sutton

[57] ABSTRACT

An exposure control circuit for camera of TTL reflective photometry type includes a shutter blind of a lower reflectivity than that of a film. The circuit is arranged such that until a given proportion of the film surface becomes exposed as a result of running of a first shutter blind, a correction semiconductor element is rendered conductive to supply a current, which represents a magnified version of minimal current from a photoelectric transducer element when reflected light from the surface of a first blind is incident on the transducer element, the current being supplied to an integrating operation. However, after the given proportion of the film surface has been exposed to increase the magnitude of the photocurrent, the correction semiconductor element is rendered non-conductive, thus allowing an integrating operation of only the photocurrent.

8 Claims, 7 Drawing Figures

EXPOSURE CONTROL CIRCUIT FOR CAMERA OF TTL REFLECTIVE PHOTOMETRY TYPE

BACKGROUND OF THE INVENTION

The invention relates to an exposure control circuit for a camera of TTL reflective photometry type, and more particularly, to an exposure control circuit for a camera of so-called TTL direct photometry type in which light from an object being photographed and passing through a taking lens is caused to be reflected by the surface of a shutter blind or a film to be incident upon a photoelectric transducer element which is used for purpose of photometry, allowing a resulting photocurrent to be immediately integrated to provide an output which is utilized for exposure control.

A single lens reflex camera of TTL direct photometry type is illustrated in FIG. 1. Specifically, there is shown a movable mirror 1 in its up position. Arranged in opposing relationship with a first shutter blind 2 and a film 3, which are shown in overlapping relationship with each other, is a photoelectric transducer element 4, which is used for purpose of photometry. The transducer element 4 is disposed on a mounting substrate 9. The movable mirror 1 is movable from its position 1A, shown in phantom line, to its up position shown as a shutter release is operated. When in its phantom line position, the mirror reflects light from an object being photographed and passing through a taking lens 8 to a focussing glass 5, and thence through pentaprism 6 and eyepiece 7 for observation by a viewer. After the movable mirror has moved to its up position, the light passing through the lens 8 is allowed to be incident upon the first shutter blind 2, which reflects the light to redirect it to the transducer element 4 for photometry. Subsequently, as the blind 2 runs, the film 3 becomes exposed to reflect the light to the transducer element 4, again for purpose of photometry. In this manner, the transducer element 4 produces a photometric output, which is used to provide an exposure control.

As is well recognized, with a focal plane shutter of the blind type, the film surface is initially covered by a first blind which comprises a black cloth. As the first blind moves in response to a shutter release operation, the film surface becomes exposed, and after a proper exposure period, a second shutter blind, which is also formed by a black cloth, runs to cover the film surface again. Consequently, a large difference between the optical reflectivity of the shutter blind surface and film surface causes a large change to be produced in the amount of light which the transducer element 4 receives. This means that a direct integration of a photocurrent produced by the transducer element 4 and which is proportional to the amount received by it cannot provide an accurate exposure period.

To cope with this problem, a conventional exposure control of the type described is designed to provide a reflectivity of a blind surface which is substantially equal to that of a film surface so that the transducer element 4 produces a photocurrent of a constant magnitude independently of the position of the shutter blind which it assumes during its running. A specific technique to provide an equal reflectivity for the blind surface comprises printing a patterned material on the blind surface which exhibits the same reflectivity as the film surface. However, the front surface of the shutter blind is usually formed by a cloth and its rear surface by a rubber lined cloth, and hence it is very difficult to treat the surface as by printing, resulting in a very expensive arrangement. In addition, variations in the pattern being printed cause a change in the reflectivity. Furthermore, winding the shutter blind at a high speed degrades the planarity of the blind and may cause an exfoliation of the pattern printed. Finally, it will be appreciated that the interior of a camera is usually provided with a black delustering paint in order to reduce stray light within a mirror box and to prevent a leakage of light to the film and the occurrence of ghosts and flares. Printing a reflective pattern on the blind surface diminishes these light extinction effects, giving rise to the occurrence of ghosts and flares.

To overcome this difficulty, the use of an equal reflectivity for the blind surface and the film surface is avoided in the prior art by providing an exposure control circuit which compensates for any exposure error which results from differential reflectivities. However, proposed techniques resulted in a complex circuit arrangement. A logarithmic compression technique may also be employed, but involves a response lag caused by a logarithmic compression diode. In particular when taking a picture in darkness (an exposure over a prolonged period of time), the accuracy of exposure control is degraded. This problem remains unsolved in a prior art exposure control circuit, disclosed in U.S. Pat. No. 4,072,961, in which a correction for the photometric value corresponding to the reflection from the first blind surface is made when the majority of the film surface becomes exposed.

SUMMARY OF THE INVENTION

In view of the foregoing, it is an object of the invention to provide an exposure control circuit for a camera of TTL reflective photometry type in which during a period of a minimal photocurrent which is caused by a reduced reflectivity of a first shutter blind surface or until the first blind reaches a given position over an image field, a photocurrent from a photoelectric transducer element is increased or doubled for flow into an integrating capacitor, and subsequently the photocurrent from the transducer element is directly integrated.

It is another object of the invention to provide an exposure control circuit for a camera of TTL reflective photometry type including a plurality of photoelectric transducer elements, each arranged to determine light reflected from a plurality of regions of an image field which are divided in the direction of running of a shutter blind, and the photocurrent from each of the transducer element is increased or doubled to cause a discharge of an integrating capacitor until the first blind passes a central location in each of the regions, whereupon the photocurrent from the individual transducer elements are directly integrated.

In accordance with the invention, any exposure error resulting from differential reflectivities of the first shutter blind surface and the film surface is avoided, by increasing or doubling a photocurrent for flow into an integrating capacitor during a period of minimal photocurrent which is caused by a reduced reflectivity of the first blind surface, and subsequently directly supplying the photocurrent to the integrating capacitor so that an integrating current of constant magnitude is supplied to the integrating capacitor from the very beginning of running of the first blind. This reduces the influence of a response lag of a logarithmic compression diode with respect to minimal current, thus enabling an exposure error to be eliminated even if the exposure is continued over an increased length of time. In this manner, an exposure control of high accuracy is assured in every exposure operation, and the circuit arrangement is greatly simplified to permit an inexpensive manufacture.

In accordance with another aspect of the invention, the integrating current is controlled over a plurality of time intervals as the first blind runs until the film surface is entirely open, thus allowing an integrating operation in accordance with the change in a photocurrent from individual transducer elements if the brightness changes from point to point over the image field. In this manner, an exposure control of a increased accuracy is assured.

DESCRIPTION OF PREFERRED EMBODIMENTS

Figure 1:
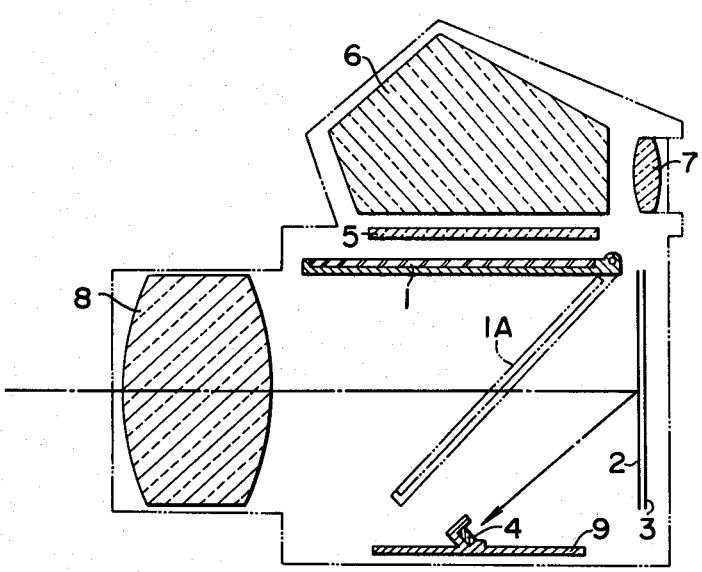
FIG. 1 is a schematic cross section of one form of single lens reflex camera of TTL reflection photometry type to which the exposure control circuit of the invention may be applied.
Figure 2:
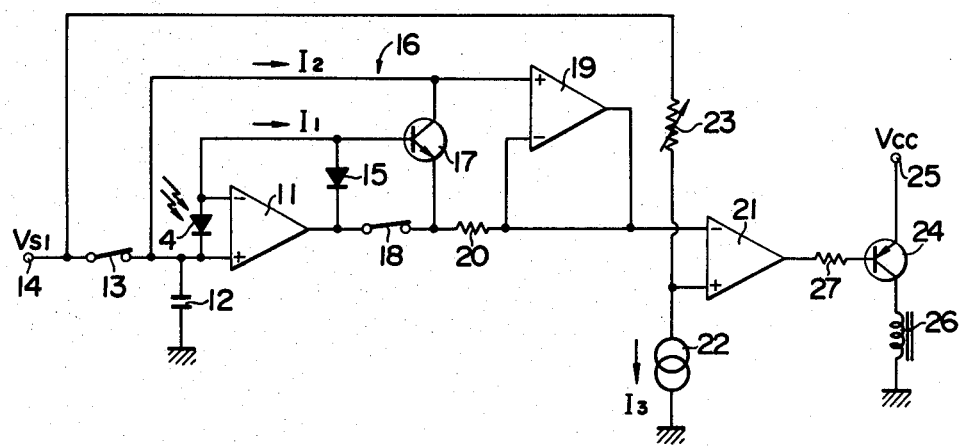
FIG. 2 is a circuit diagram of an exposure control circuit according to one embodiment of the invention.

Referring to FIG. 2, there is shown an exposure control circuit according to one embodiment of the invention. In FIG. 2, a photoelectric transducer element 4 which is used for purpose of photometry comprises a photodiode or the like, and is disposed in opposing relationship to the first shutter blind 2 and the film 3 of the camera in the manner shown in FIG. 1. Specifically, the transducer element 4 is connected across the inverting and the non-inverting input terminals of an operational amplifier 11, with its anode connected to the inverting input terminal. The non-inverting input terminal of the amplifier 11 is connected to the ground through an integrating capacitor 12, and is also connected, through a trigger switch 13 which is opened when the movable mirror 1 (see FIG. 1) moves to its up position, to a terminal 14 to which a reference voltage Vs1 is applied. In addition, a logarithmic compression diode 15 is connected across the inverting input terminal and the output terminal of the amplifier 11, with its anode connected to the inverting input terminal. A circuit arrangement including the transducer element 4, integrating capacitor 12 and logarithmic compression diode 15 connected around the amplifier 11 is known in itself, and operates to cause a discharge of the integrating capacitor 12 in accordance with the incidence of light from an object being photographed upon the transducer element 4, thereby producing a photocurrent $I_1$ through the diode 15. The illustrated exposure control circuit includes, in addition to the circuit which produces the photocurrent $I_1$, an additional circuit connected across the input and output terminals of the amplifier 11 for producing a flow of a correction current $I_2$ which is related to the photocurrent $I_1$. Specifically, an NPN transistor 17 is provided as a correction semiconductor element, and has its base connected to the inverting input terminal of the amplifier 11, its collector connected to one end of the integrating capacitor 12 which is connected to the non-inverting input terminal of the amplifier 11, and its emitter connected to the output terminal of the amplifier 11 through a control switch 18 which is adapted to be opened upon completion of running of the first blind. Thus, the base-emitter path of the transistor 17 is connected in series with the control switch 18 in shunt relationship with the anode-cathode path of the diode 15, so that when the photocurrent $I_1$ flows through the 15, a correction current $I_2$ flows through the corrector-emitter path of the transistor 17 as a discharge current from the integrating capacitor 12 as long as the control switch 18 remains closed. It is to be understood that the transistor 17 and the diode 15 are chosen to exhibit an equal characteristic, so that the current $I_2$ is equal in magnitude to the current $I_1$ by the current mirror effect.

An operational amplifier 19 is provided to take, from the transistor 17, an output from a photometric circuit 16 which produces a flow of the currents $I_1$ and $I_2$. Specifically, the collector of the transistor 17 is connected to the non-inverting input terminal of the amplifier 19, which forms a voltage follower, and the emitter of the transistor is connected to the inverting input terminal of the amplifier 19 through a resistor 20 of a high resistance. The output terminal of the amplifier 19 is returned to its inverting input terminal and is also connected to the inverting input terminal of another operational amplifier 21, which forms a comparator for deciding an exposure level. The amplifier 21 has its non-inverting input terminal connected to the ground through a source of constant current 22, which produces a flow of constant current $I_3$, and also connected to the terminal 14 through a variable resistor 23 which is utilized to preset a film speed. The output terminal of the amplifier 21 is connected through a resistor 27 to the base of a PNP transistor 24, which has its emitter connected to a terminal 25, to which a supply voltage Vcc is applied and its collector connected to the ground through an electromagnet 26 which is used to constrain a second shutter blind against running.

In operation, as the movable mirror 1 moves upward in response to the depression of a shutter button, light from an object being photographed and passing through the taking lens 8 is reflected by the first blind 2 to be incident upon the transducer element 4 (see FIG. 1). At this time, a power switch, not shown which is interlocked with the movable mirror 1 is closed to feed the exposure control circuit. Accordingly, the capacitor 12 is charged to the reference voltage Vs1 applied to the terminal 14, through the trigger switch 13. The camera used is arranged so that a diaphragm aperture is established as the movable mirror 1 moves to its up position. When the movable mirror 1 has completed its upward movement and the desired diaphragm aperture is established, the trigger switch 13 is opened. Thereupon, the photocurrent $I_1$ and the correction current $I_2$ flow from the capacitor 12, acting as a power source. When the photocurrent $I_1$ having a magnitude which depends on the amount of light incident upon the transducer element 4 flows therethrough, the current flow is divided between diode 15 and the base-emitter path of the transistor 17. Because of the identical characteristics of these elements, the conduction of the diode 15 renders the transistor 17 conductive, whereby the correction current $I_2$ equal in magnitude to the photocurrent $I_1$ flows through the collector of the transistor 17. In this manner, the capacitor 12 begins to be discharged by the sum of these currents, which is $I_1+I_2(=2I_1)$, and the voltage across the capacitor 12 which is produced by the discharge current flow $I_1+I_2$ is fed, as an output from the amplifier 11, to the inverting input terminal of the amplifier 21 through the amplifier 19.

Figure 3:
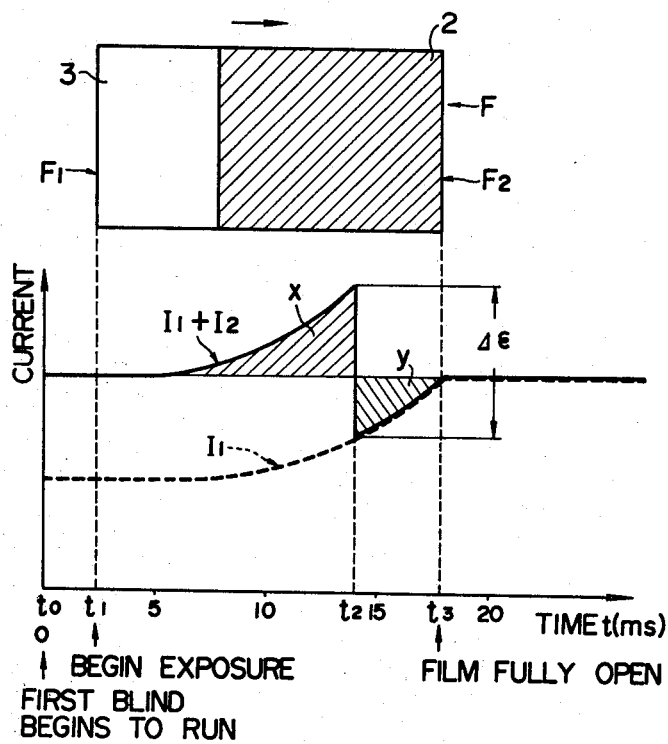
FIG. 3 graphically shows an integrating current produced by the exposure control circuit of FIG. 2.

For purpose of the present description, it is assumed that the reflectivities of the first blind surface and the film surface are related in the ratio of 1:2 in the camera shown. Based upon such assumption, the photocurrent $I_1$ changes as the first blind runs, in a manner indicated graphically in broken lines in FIG. 3. In FIG. 3, an image field F is shown in superimposed relationship with the time axis for the photocurrent $I_1$, and an area of the film 3 which becomes exposed as the first blind 2 runs is also shown. Comparing the magnitude of the photocurrent $I_1$ at time t1 when the trailing end of the first blind 2 has moved past one end F1 of the image field F to begin an exposure of the film 3 and the magnitude of the photocurrent $I_1$ at time t3 when the trailing end of the first blind 2 reaches the other end F2 of the image field F to permit the entire film surface to be exposed, it is seen that the former has a value which is one-half the value of the latter since the reflectivity of the first blind surface is equal to one-half that of the film surface. Obviously, direct integration of such photocurrent $I_1$ cannot produce an accurate exposure period. Hence, to cope with this problem, the arrangement of the invention is such that during a period of minimal photocurrent $I_1$ which is caused by a reduced reflectivity of the first blind, a current flow $I_1+I_2$ which is twice the magnitude of the photocurrent $I_1$ is produced for integrating the capacitor 12. At time t2 which is close to the time t3 when the shutter is fully open, i.e. when the film frame is fully exposed, the control switch 18 is opened in interlocked relationship with the running of the first blind, whereby the base-emitter path of the transistor 17 is interrupted. Thereupon, the potential at the emitter of the transistor 17 is equal to the potential at the inverting input and the output terminal of the amplifier 19. On the other hand, the bias across the transducer element 4 is zero and the non-inverting input terminal of the amplifier 11 is equal in potential to the output voltage from the amplifier 19, so that the potential of the base, collector and emitter of the transistor 17 has a common value, and the collector current $I_2$ of the transistor 17 reduces to a value less than 0.1 pA, which means that the transistor 17 is non-conductive. Thus, only the photo-current $I_1$ flows after time t2. To summarize, there occurs a current flow as indicated by a solid line curve in FIG. 3 which is provided as a discharge current from the integrating capacitor 12 from the beginning of running of the first blind until the full opening of the shutter.

Figure 4:
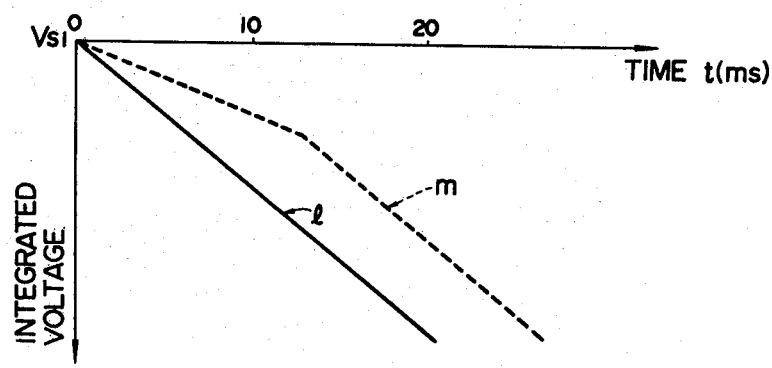
FIG. 4 graphically shows an integrated voltage produced by the exposure control circuit of FIG. 2.

Since the photocurrent $I_1$ increases as the exposed area of the film surface increases with the running of the first blind, it will be seen that the value of the total current varies by $\Delta\epsilon$ at time t2 when a shift occurs from the current $I_1+I_2$ to the current $I_1$. However, as a matter of practice, no significant exposure error occurs since the area "x" enclosed below the curve representing the current $I_1+I_2$ is substantially equal to the area "y" enclosed below the curve representing the current $I_1$, thus cancelling each other. In this manner, an integrating current of a substantially constant magnitude is produced since the beginning of running of the first blind. As a result, the terminal voltage or the integrated voltage across the integrating capacitor 12 varies in the manner of a solid line characteristic curve l shown in FIG. 4, and is fed to the inverting input terminal of the amplifier 21 from the amplifier 19. A characteristic curve m shown in broken lines in FIG. 4 represents an integrated voltage which would be obtained if the capacitor integrates only the photocurrent $I_1$ from the very beginning of running of the first blind. It will be noted that the gradient of the curve changes in the course of running of the first blind, and if such integrated voltage is utilized as a photometric output, there results an exposure error. In the exposure control circuit of the present embodiment, the integrated voltage is depicted by a rectilinear characteristic curve l having a gradient, which coincides with the gradient assumed after the full opening of the shutter, throughout the exposure from the beginning of running of the first blind.

Applied to the non-inverting input terminal of the amplifier 21 is a voltage which is equal to the reference voltage Vs1 minus a voltage drop across the variable resistor 23, which is represented as $Vs1-I_3 \cdot R_{ASA}$ where $I_3$ represents the constant current flow from the source 22 and $R_{ASA}$ the resistance of the resistor 23. This voltage defines a decision level, and if the integrated voltage reduces below the decision level, the output of the amplifier 21 changes from its "L" to its "H" level. Thereupon, the transistor 24 which has been maintained conductive since the turn-on of the power supply to energize the second blind constraining electromagnet 26 is rendered non-conductive, thus deenergizing the electromagnet 26 to allow the second shutter blind to run, thus terminating an exposure.

It will be seen from the foregoing description that to compensate for differential reflectivities of the surfaces of the first blind and the film, the photocurrent ($I_1$) which will be of a magnitude which is approximately one-half the magnitude of photocurrent prevailing after the full opening of the shutter until time t2 when substantially one-half the area of the image field F or more becomes exposed is doubled to a value, which is equal to the sum ($I_1+I_2$) for integrating the capacitor. There is thus obtained a photometric output which compensates for the differential reflectivities. It is to be noted that when the exposure is continued over a prolonged period of time, the integrating period for the photocurrent $I_1$ alone continues after the condition of the current $I_1+I_2$ flowing changes to the condition of only the photocurrent $I_1$ flowing. Consequently, if an object being photographed is located in darkness and hence the resulting photocurrent $I_1$ is minimal, the influence of a response lag by the capacitive component of the logarithmic compression diode 15 in the low current region is minimized. No substantial exposure error occurs for an exposure over a prolonged period of time exceeding 120 seconds, for example.

Figure 5:
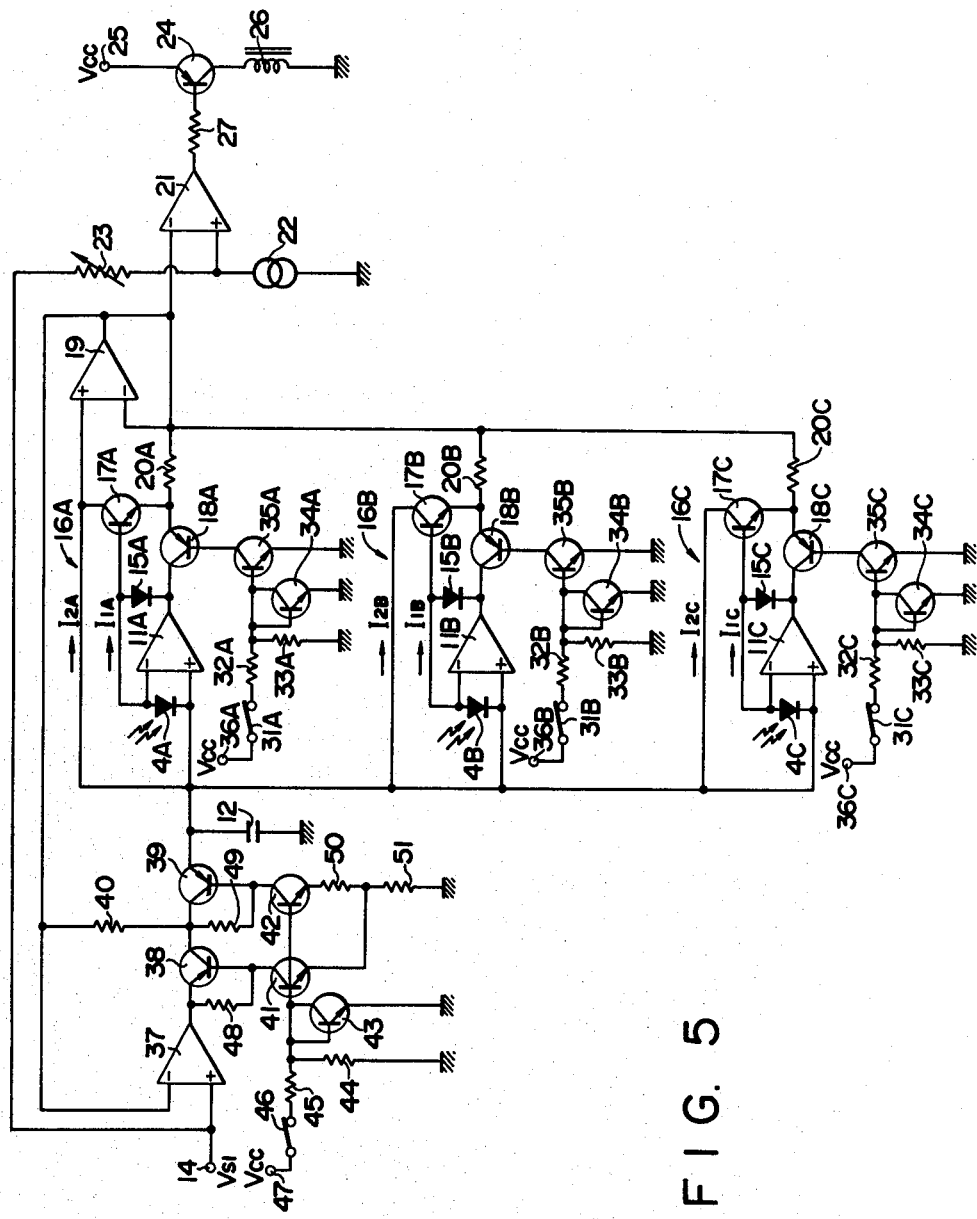
FIG. 5 is a circuit diagram of an exposure control circuit according to another embodiment of the invention.
Figure 6:
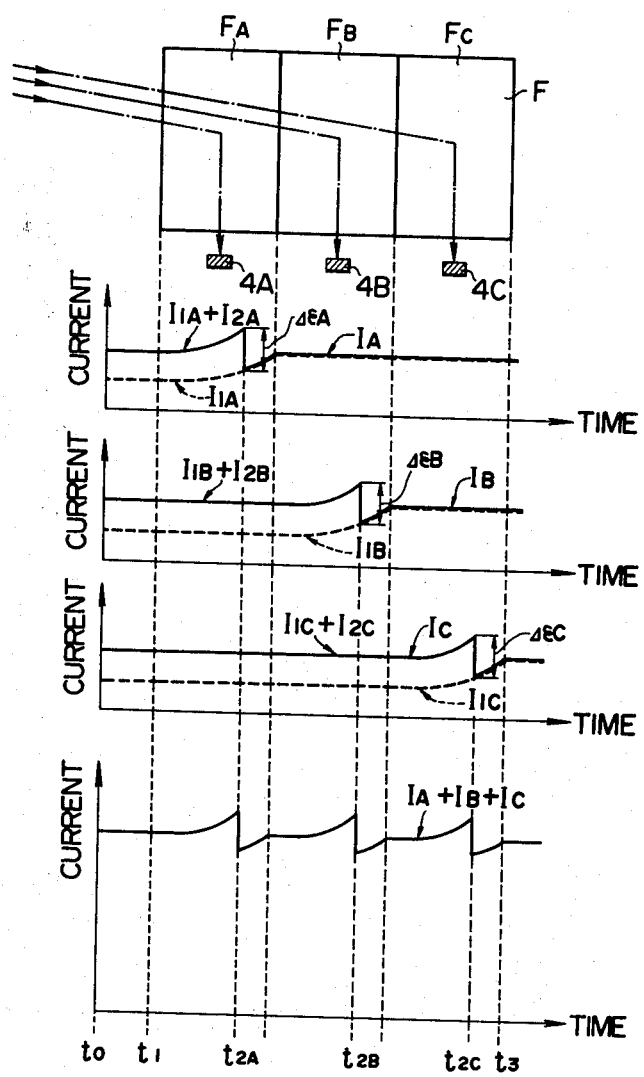
FIG. 6 graphically shows the waveform of an integrating current produced by the exposure control circuit of FIG. 5.

FIG. 5 is a circuit diagram of an exposure control circuit according to another embodiment of the invention. Such exposure control circuit is utilized in a camera as illustrated in FIG. 6. As shown, an image field F is divided into three regions $F_A$, $F_B$ and $F_C$, and three photoelectric transducer elements 4A, 4B and 4C are disposed in opposing relationship with the respective regions for receiving light reflected from each individual region for purpose of photometry. It will be understood that in the arrangement of FIG. 2, the single transducer element 4 is used to cover reflected light from the entire image field F, so that an exposure error, though slight, may be produced as a result of different brightness of light impinging upon the opposite ends of the image field F, depending on the distribution of the image of an object being photographed. However, such difficulty can be overcome by employing the three transducer elements 4A, 4B and 4C, which cooperate together to form a total reflected light image on the image field F. Referring to FIG. 5, it will be noted that the exposure control circuit of this embodiment includes three separate photometric circuits 16A, 16B and 16C, each of which is arranged in substantially the same manner as the photometric circuit 16 mentioned above and shown in FIG. 2. Specifically, in the photometric circuit 16A, photoelectric transducer element 4a, operational amplifier 11A, logarithmic compression diode 15A, transistor 17A, resistor 20A and PNP transistor 18A, which corresponds to the control switch 18 shown in FIG. 2, are connected in substantially the same manner as in the photometric circuit 16. The collector and the emitter of transistor 18A are connected to the cathode of diode 15A and the emitter of transistor 17A, respectively. A circuit including a pair of resistors 32A, 33A and a pair of NPN transistors 34A, 35A is connected between the transistor 18A and the trigger switch 31A in order to render the transistor 18A non-conductive as the trigger switch 31A is opened in interlocked relationship with running of the first blind. Specifically, a supply voltage Vcc is applied to a terminal 36A, to which one end of resistor 32A is connected through the trigger switch 31A while the other end of the resistor 32A is connected to the ground through resistor 33A. The junction between resistors 32A and 33A is connected to the base and collector of the transistor 34A and to base of the transistor 35A. The emitters of transistors 34A and 35A are connected to the ground while the collector of the transistor 35A is connected to the base of the transistor 18A.

In a similar manner, the photometric circuit 16B (16C) includes photoelectric transducer element 4B (4C), operational amplifier 11B (11C), logarithmic compression diode 15B (15C), transistor 17B (17C), resistor 20B (20C), transistor 18B (18C), trigger switch 31B (31C), resistors 32B (32C) and 33B (33C), and transistors 34B (34C) and 35B (35C), in quite the same manner as the photometric circuit 16A. It is to be understood that the trigger switches 31A, 31B and 31C are sequentially opened in the order named as the first blind runs.

The non-inverting input terminal of each amplifier 11A, 11B, 11C represents the input terminal of the photometric circuit 16A, 16B or 16C, respectively. These non-inverting input terminals are connected together to one end of an integrating capacitor 12 in common as the collectors of the transistors 17A, 17B, 17C. This end of the capacitor 12 is also connected to the non-inverting input terminal of an amplifier 19, the inverting input terminal of which is connected to one end of each of resistors 20A, 20B, 20C of the respective photometric circuits 16A, 16B, 16C. As before, the inverting input terminal of the amplifier 19 is connected to the output terminal thereof and also to the inverting input terminal of an amplifier 21.

A reference voltage Vs1 is applied to a terminal 14, to which one end of a variable resistor 23 is connected, the resistor 23 serving to preset a film speed. The non-inverting input terminal of an operational amplifier 37 is also connected to the terminal 14, and the inverting input terminal thereof is connected to the output of the amplifier 19. The amplifier 37 is configured as a differential amplifier formed by bipolar transistors having reduced voltage offset. The output terminal of the amplifier 37 is connected to the emitter of a PNP transistor 38, the collector of which is connected to the collector of another PNP transistor 39 and also connected through a resistor 40 to the inverting input terminal of the amplifier 37. The emitter of the transistor 39 is connected to one end of the integrating capacitor 12, the other end of which is connected to the ground. The base of each of the transistors 38, 39 is respectively connected to one of the collectors of NPN transistors 41, 42, respectively, which have their base electrodes connected in common and connected to the collector and the base of an NPN transistor 43 which has its emitter connected to the ground, and is also connected to the ground through a resistor 44. In addition, the base electrodes of the transistor 41, 42 are connected to a terminal 47, to which a supply voltage Vcc is applied, through a series combination of a resistor 45 and a trigger switch 46, which is opened as the movable mirror completes its upward movement. It will be noted that resistors 48, 49 are connected across the emitter and the base of the transistor 38 and across the collector and the base of the transistor 39, respectively, and a series combination of resistors 50, 51 is connected between the emitter of the transistor 42 and the ground, with the junction between these resistors 50, 51 being connected to the emitter of the transistor 41.

In operation, the trigger switches 31A, 31B and 31C and the trigger switch 46 remain closed. As a power switch (not shown) is closed in interlocked relationship with an upward movement of the movable mirror in response to the depression of a release button, the supply voltage Vcc and the reference voltage Vs1 are applied to the circuit, thus enabling it for operation. Initially, the closed trigger switch 46 renders both transistors 41, 42 conductive, which in turn renders the transistors 38, 39 also conductive. Since the operational amplifiers 37 and 19 form a closed loop circuit, the conduction of the transistors 38, 39 allows the integrating capacitor 12 to charge to a value which is substantially equal to the reference voltage Vs1, independently of the presence or absence of any voltage offset between the transistors 38, 39.

Upon completion of the upward movement of the movable mirror, the trigger switch 46 is opened, whereby the transistors 41, 42, 38 and 39 are rendered non-conductive. From this time on, the capacitor 12 begins to discharge. As mentioned previously, the transducer elements 4A, 4B, 4C are disposed in opposing relationship with individual regions $F_A$, $F_B$ and $F_C$, respectively, of the image field F, as indicated in FIG. 6, and the trigger switches 31A, 31B and 31C are sequentially opened in the sequence named as the first blind moves a certain distance past the center of the individual regions $F_A$, $F_B$, $F_C$. Until times t2A, t2B, t2C when the trigger switches 31A to 31C are opened in a sequential manner in the course of running of the first blind, integrating currents $(I_{1A}+I_{2A})$, $(I_{1B}+I_{2B})$, $(I_{1C}+I_{2C})$, which are equal to twice the respective photocurrents $I_{1A}$, $I_{1B}$, $I_{1C}$, respectively, flows as a result of the conduction of the transistors 18A, 18B, 18C in the individual photometric circuits 16A, 16B, 16C. When the trigger switches 31A, 31B, 31C are opened in the sequence named, the transistors 18A, 18B and 18C are sequentially rendered non-conductive, and thereafter only the photocurrent $I_{1A}$, $I_{1B}$, $I_{1C}$ flows through the individual associated photometric circuit 16A, 16B, 16C, respectively. FIG. 6 graphically shows the integrating current for the capacitor 12 from the beginning of running of the first blind until the shutter is substantially fully open. As shown, the total integrating current is in the form of a sum of individual integrating currents $I_A$, $I_B$ and $I_C$ of the individual photometric circuits 16A, 16B and 16C, respectively. It will be evident from the waveform of the total integrating current $(I_A+I_B+I_C)$ that there occurs a shift in the magnitude of the current at times t2A, t2B, t2C when the transistors 18A, 18B, 18C are rendered non-conductive, which shift is indicated by $\Delta\epsilon_A$, $\Delta\epsilon_B$, $\Delta\epsilon_C$, respectively. It will be seen that such shift has a reduced proportion to the total integrating current $(I_A+I_B+I_C)$ when compared with the corresponding shift occurring in the exposure control circuit of the previous embodiment, thus contributing to reducing an exposure error which might result from a differential distribution of the brightness of an object being photographed over the image field.

A further improvement in the accuracy of the exposure control can be accomplished by providing four or more photoelectric transducer elements to cover a corresponding number of regions of the image field F for purpose of photometry.

Figure 7:
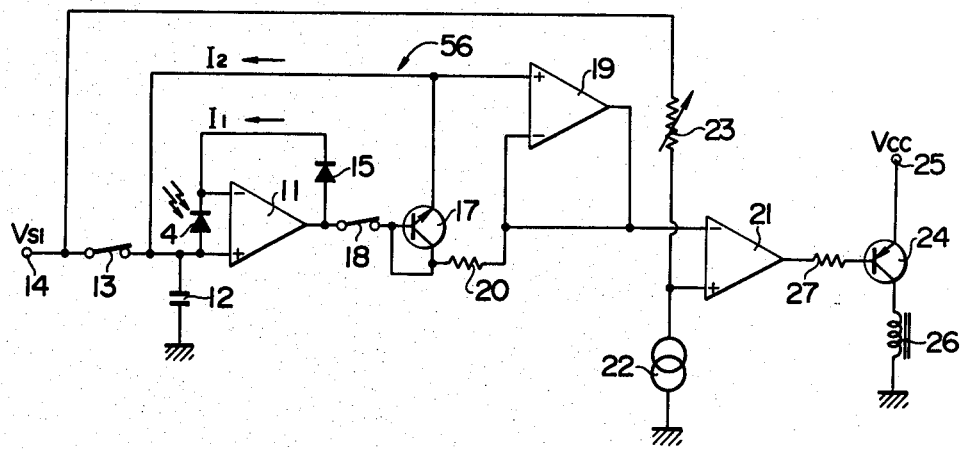
FIG. 7 is a circuit diagram of an exposure control circuit according to a further embodiment of the invention.

It should be understood that the invention is not limited to the arrangement of the embodiment shown in FIGS. 2 and 5, but the arrangement of a photometric circuit may be changed, as illustrated in FIG. 7, for example. Specifically, a photometric circuit 56 is shown in FIG. 7 where the reference voltage Vs1 is lower than the ground potential. In this instance, a photoelectric transducer element 4 is poled in the reverse direction from that shown in FIG. 2, and its anode is connected to the non-inverting input terminal of an operational amplifier 11. In response to the incidence of light from an object being photographed upon the transducer element 4, there occurs a photocurrent $I_1$ following from its cathode to its anode. Accordingly, a logarithmic compression diode 15 is reversely poled from that shown in FIG. 2, or its anode is connected to the output terminal of the amplifier 11 in order to permit such flow of photocurrent. A transistor 17 is arranged to provide a flow of a correction current $I_2$ to the non-inverting input terminal and the output terminal of the amplifier 11. Specifically, the output terminal of the amplifier 11 is connected to the base and the collector of the transistor 17 through a control switch 18, which is opened in interlocked relationship with running of the first blind. The emitter of the transistor 17 is connected to the non-inverting input terminal of the amplifier 11 and also to the non-inverting input terminal of an operational amplifier 19. In addition, the collector of the transistor 17 is connected through a resistor 20 to the inverting input terminal and the output terminal of the amplifier 19 and to the inverting input terminal of another operational amplifier 21. In other respects, the arrangement is similar to that shown in FIG. 2.

In this exposure control circuit, when the control switch 18 is closed to permit a flow of the photocurrent $I_1$, the transistor 17 conducts, whereby the correction current $I_2$ flows from the collector to the emitter thereof, permitting an integrating current equal to the sum $I_1+I_2$ to flow into the integrating capacitor 12 from the output terminal of the operational amplifier 11. When the control switch 18 is opened as the first blind runs, the transistor 17 ceases to conduct, whereby the integrating operation takes place with respect to the photocurrent $I_1$ alone. In this manner, the circuit operation is quite similar to that described in connection with FIG. 2.

In the circuit arrangements of FIGS. 2 and 7, the diode 15 may be replaced by a transistor having its base and collector connected in common. In addition, a PNP transistor may be used for the transistor 17.

In each of the described embodiments, each of the photometric circuit 16, 16A to 16C and 56 includes a single transistor 17 or 17A to 17C which is rendered conductive as the logarithmic compression diode 15 or 15A to 15C conducts. However, a plurality of such transistors 17 may be connected in shunt with each other. By way of example, when a pair of transistors 17, exhibiting the same characteristic as the diode 15, are connected in shunt with each other, the correction current $I_2$ which flows through the transistor circuit is increased to a value which is twice the photocurrent $I_1$ by the current mirror effect, whereby an integrating current which is equal to the sum $I_1+I_2=3I_1$ flows at the beginning of running of the first blind. After the first blind has moved past the center of the image field, only the photocurrent $I_1$ will be integrated. In this instance, a compensation for the referential reflectivities of the first blind and the film surface which are in the ratio of 1:3 will be made.

What is claimed is:

1. An exposure control circuit for a camera of TTL reflective photometry type comprising a photoelectric transducer element for photometry, the transducer element receiving light from an object being photographed which passes through a taking lens and which is reflected by the surface of a first shutter blind and a film as the latter becomes exposed during running of the first blind to thereby produce a photocurrent in accordance with the brightness of the light;

an amplifier having its inverting and non-inverting input terminals connected across the transducer element;

an integrating capacitor to the non-inverting input terminal of the operational amplifier for integrating the photocurrent from the transducer element;

a logarithmic compression semiconductor element connected across the inverting input terminal and the output terminal of the operational amplifier for converting the photocurrent from the transducer element into a logarithmically compressed voltage value;

a correction semiconductor element connected across the non-inverting input terminal and the output terminal of the operational amplifier and adapted to conduct as the logarithmic compression element conducts to produce a correction current corresponding to the photocurrent from the transducer element;

a control switch connected between the correction semiconductor element and the logarithmic compression semiconductor element and adapted to be opened in interlocked relationship with running of the first shutter blind to render the correction semiconductor element non-conductive;

and a comparator for comparing a terminal voltage across the integrating capacitor against a given voltage level to produce an exposure terminal signal which allows a second shutter blind to run.

2. An exposure control circuit according to claim 1 in which the photoelectric transducer element comprises a plurality of transducer elements disposed for photometry of each of a plurality of regions of an image field which follow one after another in a direction parallel to the direction of running of the shutter blind, there being provided a plurality of operational amplifiers, logarithmic compression semiconductor elements, correction semiconductor elements and control switches which are equal in number to the number of transducer elements and which are associated with the individual transducer elements, the plurality of control switches being sequentially opened as the first shutter blind moves past each of the regions.

3. An exposure control circuit according to claim 1 in which the control switch comprises a transistor.

4. An exposure control circuit according to claim 1 in which the photoelectric transducer element comprises a photodiode, the logarithmic compression semiconductor element comprises a diode and the correction semiconductor element comprises an NPN transistor, the anode of the photodiode, the anode of the diode and the base of the NPN transistor being connected to the inverting input terminal of the operational amplifier, the cathode of the photodiode and the collector of the NPN transistor being connected to the non-inverting input terminal of the operational amplifier, the output terminal of the operational amplifier being connected to the cathode of the diode and also to the emitter of the NPN transistor through the control switch.

5. An exposure control circuit according to claim 1 in which the photoelectric transducer element comprises a photodiode, the logarithmic compression semiconductor element comprises a diode, and the correction semiconductor element comprises an NPN transistor, the cathode of the photodiode and the cathode of the diode being connected to the inverting input terminal of the operational amplifier, the anode of the photodiode and the emitter of the NPN transistor being connected to the non-inverting input terminal of the operational amplifier, the output terminal of the operational amplifier being connected to the anode of the diode and also to the base and the collector of the NPN transistor through the control switch.

6. An exposure control circuit for a camera of the TTL reflective photometry type comprising:

a capacitor;

amplifier means including a photoelectric transducer element for photometry being coupled to said capacitor for leading current away from said capacitor along a first current path in accordance with the incidence of light from an object being photographed falling upon said transducer element, whereupon a first current is led away from said capacitor in accordance with the magnitude of the light incident on said transducer element;

a second current path including switch means responsive to said first current for leading away a second current from said capacitor;

means for comparing the voltage across said capacitor against a reference level for generating an exposure termination signal when the voltage across said capacitor drops below said reference level;

means responsive to running of the opening shutter blind for deactivating said switch means at a predetermined time to terminate the flow of current in said second current path whereby the total current led away from the capacitor is increased during at least an initial portion of the running of the first shutter blind.

7. The circuit of claim 6 wherein said switch means comprises transistor means coupled between the output of said amplifier means and one terminal of said integrating capacitor.

8. The control circuit of claim 7 where said first current path is comprised of said transducer element and a compression diode connected in series between one terminal of the integrating capacitor and the output of said amplifier means.

* * * * *

UNITED STATES PATENT AND TRADEMARK OFFICE
CERTIFICATE OF CORRECTION

PATENT NO. : 4,367,022
DATED : January 4, 1983
INVENTOR(S) : Yamasaki

It is certified that error appears in the above—identified patent and that said Letters Patent is hereby corrected as shown below:

Column 3, line 14, change "of a" to --of an--.

Column 4, line 16, change "15" to --diode 15--.

Column 7, line 56, change "as the" to --as are the--.

Column 8, line 21, change "transistor" to --transistors--; and on line 65, change "flows" to --flow--.

Column 9, line 41, change "following" to --flowing--.

Signed and Sealed this

Fifth Day of July 1983

[SEAL]

Attest:

Attesting Officer

GERALD J. MOSSINGHOFF

Commissioner of Patents and Trademarks